(12) United States Patent
Chen

(10) Patent No.: US 6,942,808 B2
(45) Date of Patent: Sep. 13, 2005

(54) OXIDATIVE EVAPORATION PROCESS AND APPARATUS

(76) Inventor: Philip T. Chen, 28 Fairview Ave., Montvale, NJ (US) 07645

(*) Notice: Subject to any disclaimer, the term of this patent is extended or adjusted under 35 U.S.C. 154(b) by 154 days.

(21) Appl. No.: 10/348,798

(22) Filed: Jan. 22, 2003

(65) Prior Publication Data
US 2003/0217979 A1 Nov. 27, 2003

Related U.S. Application Data
(60) Provisional application No. 60/349,825, filed on Jan. 22, 2002.

(51) Int. Cl.$^7$ ................................................. C02F 1/72
(52) U.S. Cl. ..................... 210/721; 210/737; 210/758; 210/765; 210/180; 210/205
(58) Field of Search ................................. 210/721, 737, 210/758, 765, 175, 180, 205

(56) References Cited

U.S. PATENT DOCUMENTS

| 4,141,829 A | * | 2/1979 | Thiel et al. ................. 210/762 |
| 4,795,568 A |   | 1/1989 | Chen |
| 5,205,906 A | * | 4/1993 | Grutsch et al. ............ 159/47.3 |
| 5,284,589 A | * | 2/1994 | Tegtmeyer et al. ......... 210/641 |

* cited by examiner

Primary Examiner—Betsey Morrison Hoey
(74) Attorney, Agent, or Firm—Goodwin Procter LLP

(57) ABSTRACT

The present invention is an oxidative reaction that converts organic content in the wastewater into harmless $CO_2$ and $H_2O$. The heat produced by the oxidative reaction evaporates the water, thereby concentrating the remaining solids in solution. The final product from the process is the crystal form of sodium carbonates and other oxidized salts carried in by the raw wastewater.

10 Claims, 3 Drawing Sheets

OXIDATIVE EVAPORATION PROCESS AND APPARATUS

CROSS-REFERENCE TO RELATED APPLICATION

This application claims the benefit of provisional patent No. 60/349,825 filed Jan. 22, 2002, which is hereby incorporated by reference.

BACKGROUND OF THE INVENTION

1. Field of the Invention

This invention generally related to a system and method for treating industrial wastewater containing organic matter and mineral salts.

The basic concepts underlying the oxidative evaporation process are as follows:

a. All oxidative reactions are exothermic (heat generating) processes. In order to have complete oxidation, the heat that is generated must be removed. On the other hand, the evaporation of water is a heat consuming process. Coupling these two processes in situ creates a symbiotic environment in which the heat generated through oxidative reactions facilitates the evaporation of water, the heat consuming nature of which promotes improved oxidation.

b. When the oxidative reactions take place among organic compounds and oxygen, the reaction yields $CO_2$ and water as the end products. By maintaining the reaction environment in alkaline, the $CO_2$ produced in the reaction is neutralized to form carbonates. The carbonates are water soluble and are retained in the liquid solution. This neutralization reaction is also exothermic in nature, thereby generating heat that can be used to evaporate more water.

c. Water vapor generated in a confined vessel is in an equilibrium state with respect to the coexistence of water and steam. The water vapor, saturated steam, can be removed out of the vessel by sweeping with inert gas (i.e., gas that has no affinity to steam), such as oxygen gas. The amount of water vapor withdrawn from the vessel is proportional to the rate of gas flow sweeping through the vessel. Under the operation controlling at a constant temperature in the reactor, the amount of water to be evaporated can thereby be precisely controlled by the gas flow through the vessel.

d. As the result of water evaporation, the concentration of the solids in the remaining liquid increases. Further evaporation of water can be achieved by introducing the high temperature liquid to a low pressure chamber, the so-called flashing evaporation. The flashing evaporation is an adiabatic process that no heat is supplied for evaporation of water. In the process of adiabatic evaporation, water is evaporated while the temperature of the remaining liquid decreases.

e. Since the temperature of the depressurized solution becomes lower than that of the off-gas stream from the reactor, the depressurized solution can be used as the cooling media to absorb heat from the reactor off-gas. The water in the cooling media will also evaporate while being heated by the off-gas.

f. By recycling the depressurized solution back to the reactor system, the salts in the feed and that produced in the reactor system will accumulate in the circulating stream. Eventually, the liquid solution will become saturated With the oxidized salts, which will be recovered in the form of crystals upon cooling.

2. Description of the Related Art

The conventional process for treating wastewater containing organic compounds, with the use of high temperature and pressure, is known as the Wet Air Oxidation Process. In the Wet-Air-Oxidation process, liquid and air (the oxidizing agent) are co-currently mixed to form a two phase flow throughout the reaction area, and that the process requires to suppress water vaporization in order to maintain this mixed phase flow. The end product of the Wet-Air-Oxidation process remains as liquid effluent that requires a secondary treatment before the final disposal.

The conventional process for evaporation refers to the single or multi-effect evaporation systems. The conventional evaporation system is generally operated under vacuum. The heat required for evaporation of water solely relies on the supplies from outside sources, and the removal of the generated vapor relies on vacuum pumping operations performed by means of mechanical or hydraulic devices. In contrast to those features, the process of this invention is operated under pressurized condition, utilizing the heat generated by the oxidative and neutralization reactions for evaporating water in situ, and provides a forced circulating gas to remove vapor generated in the reactor at a controlled rates.

SUMMARY OF THE INVENTION

The Oxidative Evaporation Process is a chemical-physical operation system. The oxidative reaction converts the organic content in the wastewater into harmless CO2 and H2O. The heat produced by the oxidative reaction evaporates the water, thereby concentrating the remaining solids in solution. The final product from the process is the crystal form of sodium carbonates and other oxidized salts carried in by the raw wastewater. This invention describes the specific process variations for handling different type of wastewater, the various process set-ups, the process operations and the process controls pertinent to the specific process technology.

DESCRIPTION OF THE DRAWINGS

The figures below depict various aspects and features of the present invention in accordance with the teachings herein.

DESCRIPTION OF THE PREFERRED EMBODIMENT

Figure 1:
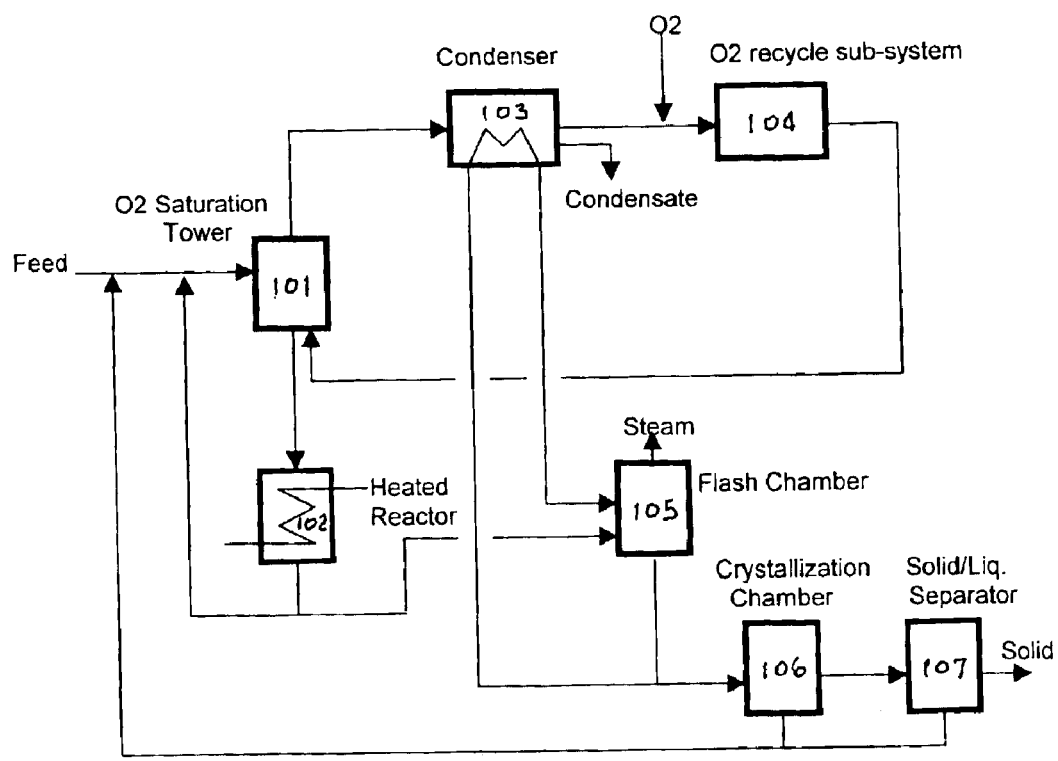
FIG. 1 is a schematic diagram of the process variation for Mixed Oxidative/Evaporative Mode of operation.

The process consists of two major parts, namely the reactor system and the solid recovery system (refer to FIG. 1) The reaction system and the solid recovery system are combined and operated in series:

The reactor system consists of the Oxygen Saturation Tower (101); the heated Reactor (102), the Condenser (103) and the excess oxygen recycle subsystem (104). The process flow follows:

1) The raw wastewater, the pH pre-adjusted alkaline waste solution, is fed to the upper part of the Tower (101). 2) Oxygen gas is introduced from the bottom of the Tower (101), constituting a gas-liquid counter-current flow pattern in the Tower (101). 3) In the Tower (101), a constant gas-liquid inter-phase is maintained. The oxidative reactions and evaporation of water take place simultaneously in the Oxygen Saturation Tower (101).

4) The Oxygen Saturation Tower (101) bottoms is pumped through the heated Reactor (102) to recycle back to the Tower (101) by joining the raw wastewater feed. An extensive recycling of liquid in the Tower (101) provides a sufficient oxygen/liquid contact in the liquid phase. 5) The oxygen gas, with its flow rate controlled, is used as the oxidation agent as well as the vapor sweeping media. 6) The off-gas swept out of the Tower (101) consists of the excess oxygen gas and water vapor. The water vapor is condensed at the Condenser (103) as the liquid product of the process and is separated from the non-condensable oxygen gas. 7) The separated excess oxygen is recycled back to the Tower (101) with the aid of gas booster pump.

The solid recovery system consists of the Flash Chamber (105); the Crystallization Chamber (106) and the Solid/liquid Separator (107). The effluent from the Reactor (102), containing salts carried in by the feed and that formed in the reactions, is at high temperature and pressure. A further evaporation of water and salt are recovered by the following steps:

a. In the Flash Chamber (105) the high temperature and pressure liquid stream is depressurized. (Adiabatic Evaporation) In the process of depressurizing the liquid stream, a portion of water is converted into steam, leaving the dissolved salts in the liquid. Consequently, the concentration of the solids in the liquid increases, and the temperature of the depressurized liquid lowered automatically.

b. The depressurized low temperature stream is used for cooling the Tower off-gas. The Tower off-gas is at high temperature and pressure. The off-gas heats up the depressurized low temperature liquid, which further evaporates water during heating.

c. The Crystallizing Chamber (106) is provided to cool the Flash Chamber (105) bottoms to form salt crystals.

d. The Solid/liquid Separator (107) is provided to recover salts as solid product. The mother liquor is returned to the Tower (101).

The solids recovery portion of the process flow is described as follows:

1) The Reactor (102) bottoms stream is introduced to the Flash Chamber (105) where the high temperature liquid stream is depressurized. 2) The depressurized solution is sent to cool the Tower (101) off-gas and then returns back to the Flash Chamber (105). 3) The steam generated in the Flash Chamber (105) is a reusable heat source. However, it can be purged to the atmosphere, if it is unused. 4) The Flash Chamber (105) bottoms, which pass through the Crystallizing Chamber (106) and the Solid/liquid Separator (107), is recycled back to the Oxygen Saturation Tower (101) as mother liquor. (Mother liquor is a low temperature saturated solution discharged from the Solid/liquid Separator (107).) Since the salt content in the raw wastewater feed and that produced in the oxidative reactions are retained and accumulated in the circulating liquid, the circulating liquid will eventually become saturated with salts. 5) The salts in crystalline form are obtained upon cooling in the Crystallizing Chamber (106) and in the Solid/liquid Separator (107).

In the operation of the process, the receiving raw wastewater is generally the solution that contains multiple species of organic compounds. The compounds difficult to be oxidized need to be separated from the oxidized product (carbonate) and recycled to the reaction system for gaining extra time-space to contact with oxygen until a complete destruction of the compounds is done. Therefore, recycling the mother liquor, which contains all the dissolved non-oxidized residues, is a distinct and necessary feature of the process constituent.

In the process, water evaporates in the Oxygen Saturation Tower (101) and vaporizes in the Flash Chamber (105). The Oxygen Saturation Tower (101) and the Flash Chamber are also utilized as a sink (concentrator) for salts within the process systems. By returning the mother liquor to the reaction system, the salts in the feed and the salts formed by the chemical reactions are confined in the circulating liquid. The salt laden circulating liquid eventually becomes saturated with salts and crystallizes upon being cooled.

The operation of the process combining the reaction system and solid recovery system in series constitutes the mechanism of a multi-effect evaporation operated under pressurized condition. The mechanism of the multi-effect evaporation can be visualized by the operation requirement that the pressure in the Oxygen Saturation Tower (101) is maintained higher than that in the Flash Chamber. When the pressure in the Oxygen Saturation Tower is cascaded down to the following low pressure Flash Chamber (105), the steam in the Oxygen Saturation Tower off-gas stream can be used as the media to evaporate water carried in the depressurized liquid, from or in the Flash Chamber. The way that the water is evaporated in the described process is virtually a heat saving two-effect evaporation mechanism.

Process Variations

The process systems described above can be varied to suit differing types of wastewater being treated. There are at least three conceivable modes of operation, that the process set-ups are modified accordingly:

1. Mixed oxidative/evaporative mode of operation (refer to FIG. 1)—This variation is considered to be the most common mode of operation in treating wastewater that contains high concentrations of organic compounds and salts. In the reactor, the organic compounds are destroyed (oxidized) by oxygen and water is evaporated simultaneously. In this mode of operation, the following process functions are performed:

a. The water vapor removed from the Oxygen Saturation Tower (101) is cooled at the Condenser (103) to form condensate as a process product. The amount of water vapor carried out from the Tower (101) is proportional to the rate of gas flow through the Tower (101). By controlling the gas flow rate, the removal of a constant amount of water vapor from the Tower (101) can be obtained. The condensate recovered is a salt free water solution, which is readily separated from the non-condensable excess oxygen. The excess oxygen is recycled to the Oxygen Saturation Tower (101).

b. The salt produced in the reaction, the carbonate, along with the salts carried in the feed are retained in the liquid circulating in the reactor system, which are recovered as the crystallized solids upon cooling.

Figure 2:
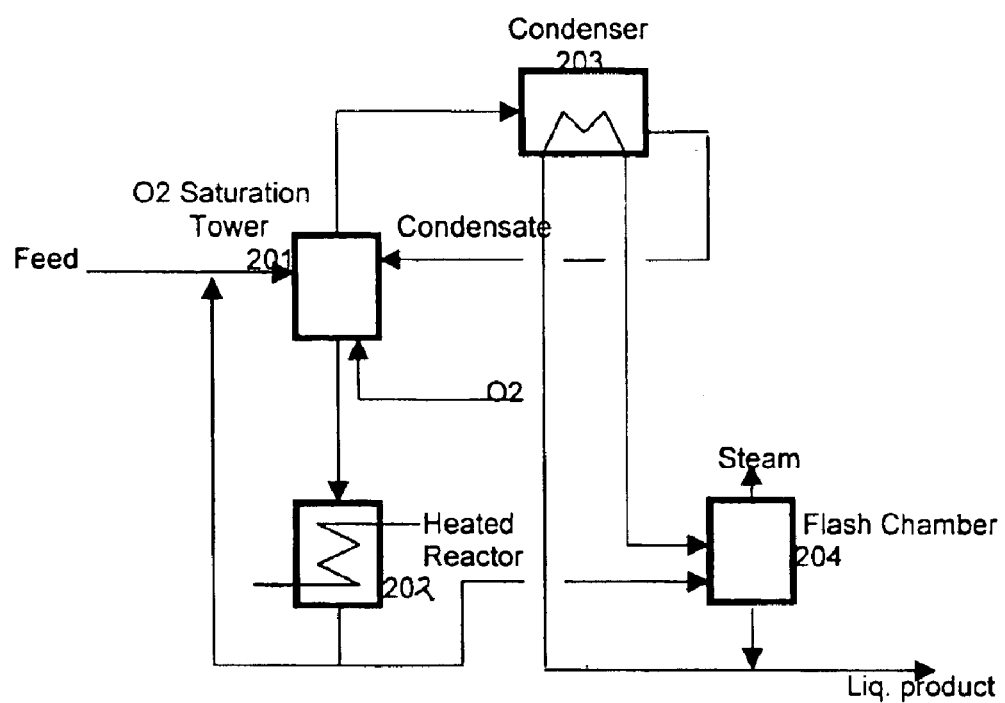
FIG. 2 is a schematic diagram of the process variation for Oxidative Mode of operation.

2. Oxidative mode of operation, processing without oxygen recycle (refer to FIG. 2)—For feed that contains organic matter but either no salts or the salt content is low, the solid recovery through evaporation of water is not required. The main process function is, mainly to destroy/detoxify the target compounds in the wastewater. The organic compounds in wastewater will be oxidized to yield carbon dioxide and water. In turn, the carbon dioxide is absorbed in alkaline solution to form carbonate retained in the liquid phase. In this mode of operation, the process set-up includes:

a. The oxygen gas recycling and the solid recovery are not required, therefore, there will be no off-gas outlet from the reactor. (see Exhibition 2) The oxygen gas consumed in the reactor is automatically supplemented as the dissolved oxygen in the liquid depletes when the oxidation reactions take place in the process. The automatic supplementation of oxygen gas can be achieved by controlling the gas delivery pressure constant at the pressure of the Oxygen Saturation Tower (201). The condesate obtained in the overhead vapor Condenser (203) is returned to the Oxygen Saturation Tower (201).

b. A portion of the Reactor (202) effluent is discharged to the Flash Chamber (204) in which water vaporizes and the liquid temperature decreases. The depressurized liquid can therefore be used as cooling media at the overhead Condenser (203).

Figure 3:
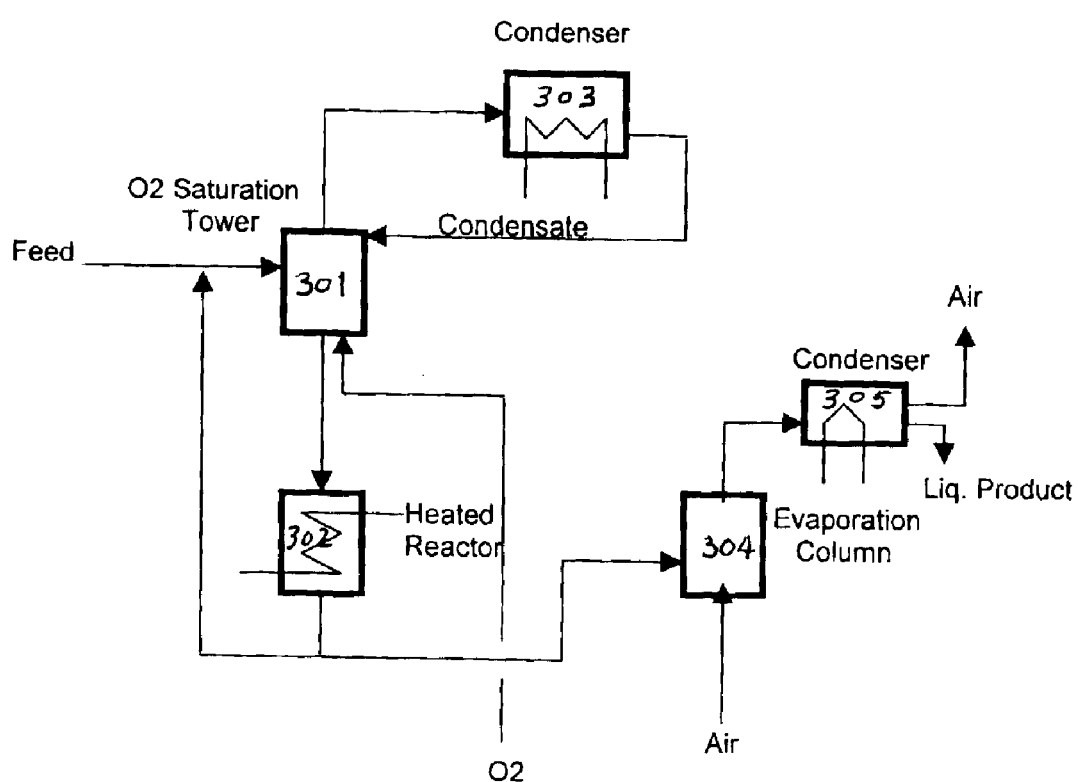
FIG. 3 is a schematic diagram of the process variation for Evaporative Mode of operation.

3. Evaporative mode of operation (refer to FIG. 3)—For the purpose of recovering the water in the feed as the main product of the operation, the oxidation and evaporation operations can be performed separately. In this mode of operation, the feed is first introduced into the Oxygen Saturation Tower (301) as that of the Oxidation Mode of operation. The reaction system is the same as that of the Oxidative Mode of operation, where no off-gas outlet is provided in the reactor system. The Reactor (302) effluent is then introduced to the Evaporation Column (304) (replacing the Flash Chamber used in the Oxidative Mode of Operation) where the evaporation of water is carried out at a lower pressure than that of the oxidation reactor system. The water vapor sweeping gas used in the Evaporation Column (304) can be air or any other inert gas instead of oxygen. The water vapor is condensed at the overhead condenser (305) where water and air is separated. The condensed water is recovered as the product. Air is purged to the atmosphere.

Process Control Parameters

The process control parameters include reaction temperature and pressure, oxygen gas flow rate, and the steam release pressure at the Flash Chamber. Each of these parameters affects the performance of the oxidative reactions and the rate of the evaporation of water. The effect of each parameter on the process performance is described as follows:

1. Reaction temperature—Generally, a higher reaction temperature will shorten the reaction time. The reaction at a high temperature will also enhance the evaporation of water in the reactor. A significant enhancement of evaporation is seen for temperatures over 300 F.

2. Pressure in the Oxygen Saturation Tower—High pressure in the Tower is needed in order to maintain sufficient quantities of dissolved oxygen in the liquid phase. However, the pressure in the reactor suppresses water from evaporating. Therefore, the pressure in the reactor should be kept at minimum, especially for cases where the process is operating in the evaporation mode.

3. Flow Rates of Oxygen gas—Pressurized oxygen gas is used to provide dissolved oxygen in the liquid as the reagent for oxidizing organic compounds. An excess amount of oxygen is required for use as the sweeper for removing water vapor out of the Tower. The oxygen flow under a constant pressure removes water vapor at a constant rate. The amount of water vapor removed out of the Tower is proportional to the gas flow rate.

4. Steam release pressure at the Flash Chamber—The high pressure maintained in the reactor systems must be brought down to the atmospheric conditions at the end of the process. The Flash Chamber is provided to reduce the pressure by flashing the high-temperature stream at a lower pressure. The pressure to be released at the Flash Chamber can be set to suit the requirements of the steam end user. For the pressure setting for release, the higher releasing pressure, the less amount of water will be converted to steam in the Flash Chamber.

In the manner described above, the present invention thus provides a system and method to treat wastewater containing organic matter and/or reduced non-organic compounds. While this invention has been described with reference to the preferred embodiments, these are illustrative only and not limiting, having been presented by way of example. Other modifications will become apparent to those skilled in the art by study of the specification and drawings. It is thus intended that the following appended claims include such modifications as fall within the spirit and scope of the present invention.

What is claimed is:

1. A wastewater treatment system for treating a wastewater stream comprising organic compounds and salts which comprises:
   (1) a reaction system to simultaneously carry out oxidative reactions with at least one of the organic compounds contained in the wastewater stream and evaporation of water in situ from the wastewater stream, wherein the reaction system comprises:
      a. an oxygen saturation tower to provide contact of oxygen gas with a wastewater feed solution which is introduced into the tower;
      b. a heated reactor to provide heat to a tower bottoms stream comprising liquid and salts which exits from the tower; and
      c. an oxygen recycle system to provide circulation of oxygen in the reaction system and reuse of excess oxygen; and
   (2) a solid recovery system to concentrate the salts carried in the wastewater stream and salts produced in the oxidative reactions as oxidized salts in solid form.

2. The system as recited in claim 1, wherein the solid recovery system comprises:
   a. a flash chamber which receives a reactor bottoms stream from the heated reactor,
   b. a crystallization chamber which receives a flash chamber bottoms stream from the flash chamber; and
   c. a solid-liquid separator which receives a crystallization chamber exit stream comprising liquid and solid salts.

3. The system as recited in claim 1, wherein the wastewater feed solution is fed at the upper part of the oxygen saturation tower and the oxygen gas is introduced to the tower at the bottom to form a gas/liquid counter-current flow and the tower provides:
   a. an off-gas stream at the top of the tower;
   b. a liquid stream at the bottom of the tower.

4. The system as recited in claim 1, wherein the alkalinity of the wastewater feed solution is pre-adjusted to approximately the range of pH 8–14.

5. The system as recited in claim 1, wherein the oxygen gas is utilized as an oxidation reagent as well as a water vapor sweeping media; and the amount of water vapor removed from the oxygen saturation tower is controlled by the flow rate of the water vapor sweeping media.

6. The system as recited in claim 5, wherein the oxygen gas is automatically supplemented by an oxygen supply source in an amount as consumed in the reactor system, and the oxygen delivery pressure at the oxygen supply source is controlled at a constant pressure that maintains the operating pressure of the oxygen saturation tower.

7. A wastewater treatment process comprising.
   (a) providing a wastewater feed stream which comprises organic matter and salts;
   (b) contacting the wastewater feed stream with oxygen in an oxygen saturation tower, having an upper portion and a lower portion, wherein the oxygen is introduced at the lower portion of the tower, the pressure of the oxygen delivered to the tower is equal to the pressure within the tower, and a gas-liquid interphase is maintained in the tower, thereby obtaining a tower off-gas stream comprising oxygen and water vapor which exits the oxygen saturation tower, and a tower bottoms stream comprising liquid and salts which exits the oxygen saturation tower;
   c) introducing the lower off-gas stream to a condenser, thereby obtaining a condenser gas stream comprising oxygen which exits from the condenser and is recycled to the oxygen saturation tower, and a condensate stream;
   (d) introducing the lower bottoms stream to a heated reactor, thereby obtaining a reactor bottoms stream which exits from the heated reactor;
   (e) recycling a portion of the reactor bottoms stream into the wastewater feed stream;
   (f) introducing the remaining portion of the reactor bottoms stream to a flash chamber, thereby obtaining steam and a flash chamber bottoms stream comprising salts and liquid which exits from the flash chamber;
   (g) introducing a portion of the flash chamber bottoms stream into the condenser to cool the tower off-gas stream, and recycling the portion of the flash chamber bottoms stream to the flash chamber;
   (h) introducing the remaining portion of the flash chamber bottoms stream into a crystallization chamber, thereby obtaining a crystallization chamber bottoms stream comprising liquid and solid salts which exits from the crystallization chamber; and
   (i) introducing the crystallization chamber exit stream into a solids-liquid separator, thereby obtaining a solids-liquid separator bottoms stream comprising mother liquor which exits from the solids-liquid separator and is recycled to the wastewater feed stream, and a solids stream comprising solid and salts which exits from the solid-liquid separator.

8. A process for treating wastewater containing organic matter and low salt content comprising:
   (a) providing a wastewater feed stream which comprises organic matter;
   (b) contacting the wastewater feed stream with oxygen in an oxygen saturation tower having an upper portion and a lower portion, wherein the oxygen is introduced at the lower portion of the tower, the pressure of the oxygen delivered to the tower is equal to the pressure within the tower, and a gas-liquid interphase is maintained in the tower, thereby obtaining a tower off-gas comprising oxygen and water vapor which occupies a space in the upper portion of the tower, and a tower bottoms stream comprising liquid and salts which exits from the lower portion of the tower;
   (c) introducing the tower off-gas to a condenser, thereby obtaining a condensate water stream which is recycled to the tower;
   (d) introducing the tower bottoms stream to a heated reactor, thereby obtaining a reactor bottoms stream which exits from the heated reactor;
   (e) recycling a portion of the reactor bottoms stream into the wastewater feed stream;
   (f) introducing the remaining portion of the reactor bottoms stream to a flash chamber thereby depressurizing the reactor bottoms stream to obtain steam, and a flash chamber bottoms stream comprising salts and liquid which exits from the flash chamber;
   (g) introducing a portion of the flash chamber bottoms stream into the condenser to cool the tower off-gas, and recycling the portion of the flash chamber bottoms stream to the flash chamber;
   (h) discharging the remaining portion of the flash chamber bottoms stream as a final effluent.

9. A wastewater treatment process for recovering a water part of a wastewater stream, comprising:
   (a) providing a wastewater feed stream which comprises organic matter and salts;
   (b) contacting the wastewater feed stream with oxygen in an oxygen saturation tower having an upper portion and a lower portion, wherein the oxygen is introduced at the lower portion of the tower, the pressure of the oxygen delivered to the tower is equal to the pressure within the tower, and a gas-liquid interphase is maintained in the tower, thereby obtaining a tower off-gas comprising oxygen and water vapor which occupies a space in the upper portion of the tower, and a tower bottoms stream comprising liquid and salts which exits from the lower portion of the tower;
   (c) introducing the tower off-gas to a first condenser, thereby obtaining a condensate water stream which is recycled to the tower;
   (d) introducing the tower bottoms stream to a heated reactor, thereby obtaining a reactor bottoms stream which exits from the heated reactor;
   (e) recycling a portion of the reactor bottoms stream into the wastewater feed stream;
   (f) introducing the remaining portion of the reactor bottoms stream to an evaporation column having a lower portion and an upper portion, wherein the evaporation column is operated at a pressure lower than the pressure of the tower;
   (g) introducing a vapor sweeping gas into the lower portion of the evaporation column, thereby obtaining a gas stream comprising water vapor and the vapor sweeping gas which exits from the upper portion of the evaporation column; and
   (h) introducing the gas stream comprising water vapor and the vapor sweeping gas exiting the upper portion of the evaporation column into a second condenser to obtain air and liquid produced from the second condenser.

10. The process of claim 9, in which the vapor sweeping gas is air.

* * * * *